United States Patent [19]

Musch et al.

[11] 4,443,582

[45] Apr. 17, 1984

[54] MIXTURES OF CHLOROPRENE POLYMERS AND THE PRODUCTION THEREOF

[75] Inventors: Rüdiger Musch, Bergisch-Gladbach; Gottfried Pampus, Cologne; Peter Müller, Kerpen; Ulrich Eisele, Leverkusen; Wolfgang Konter, Neuss; Wilhelm Göbel, Leverkusen, all of Fed. Rep. of Germany

[73] Assignee: Bayer Aktiengesellschaft, Leverkusen, Fed. Rep. of Germany

[21] Appl. No.: 379,919

[22] Filed: May 19, 1982

[30] Foreign Application Priority Data

May 26, 1981 [DE] Fed. Rep. of Germany ....... 3120992

[51] Int. Cl.$^3$ .............................................. C08L 27/04
[52] U.S. Cl. .................................... 525/215; 525/226; 525/235; 526/173; 526/174; 526/338
[58] Field of Search ....................... 525/215, 235, 226; 526/173, 174, 338

[56] References Cited

U.S. PATENT DOCUMENTS 4,234,704 11/1980 Sakanaka et al. ................... 525/215

Primary Examiner—J. Ziegler
Attorney, Agent, or Firm—Connolly and Hutz

[57] ABSTRACT

This invention relates to a polychloroprene elastomer distinguished by good processing properties and high tensile strength in the form of a polychloroprene mixture containing a sol polymer and a gel polymer in a ratio, by weight, of from 1:4 to 9:1, characterized in that both polymers have been produced in the presence of from 2.5 to 4.0 parts, by weight, of the potassium salt of disproportionated abietic acid (expressed as acid), from 0.3 to 1.0 part, by weight, of a condensation product of naphthalene sulphonic acid and formaldehyde and from 0.1 to 1.5 parts, by weight, of potassium hydroxide, based in each case on 100 parts, by weight, of monomer, and in that the gel polymer is a copolymer of chloroprene and from 1.5 to 2.5 mole percent, based on total monomer, of a diester corresponding to the following general formula:

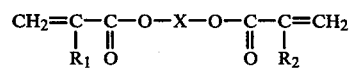

wherein
$R_1$ and $R_2$ represent hydrogen, chlorine or $C_1$–$C_4$ alkyl; and
X represents $C_2$–$C_{10}$ alkylene.

4 Claims, No Drawings

MIXTURES OF CHLOROPRENE POLYMERS AND THE PRODUCTION THEREOF

This invention relates to polychloroprene elastomers, which are distinguished by good processing properties and by high tensile strength, and to the production thereof. In the context of the present invention, good processing properties are to be understood to include, for example, the dimensional stability of the extrudates, shorter rough-sheet formation times and higher injection capacity.

One possibility of producing polychloroprene elastomers having such advantageous properties is to added a latex of a cross-linked polychloroprene (gel polymer) to a latex of a benzene-soluble polychloroprene (sol polymer) and to isolate the rubber, for example by low-temperature coagulation.

To produce the gel polymer, chloroprene may be copolymerised with a bifunctional monomer. One particularly advantageous process of this type is described in DE-AS No. 1,720,107.

Mixtures of such sol and gel chloroprene polymers have hitherto been attended by the disadvantage that the addition of the gel polymer to the sol polymer adversely affected the mechanical properties of the vulcanisates, for example the tensile strength thereof.

Various possibilities have been proposed with a view to reducing the deterioration in mechanical properties cf. for example DE-AS No. 2,008,673.

Inspite of this, its has not been possible to prevent the addition of the gel polymers to the sol polymer from steadily impairing the tensile strength.

It has now been found that it is possible to produce a cross-linked chloroprene polymer which, in mixtures with benzene-soluble chloroprene polymers, gives a rubber which has the favourable processing properties required, but of which the vulcanisates show considerably higher tensile strength than hitherto known vulcanisates of polychloroprene. Vulcanisates of rubber mixtures containing the gel component according to the present invention may even have tensile strengths which are at least as high as the tensile strength of the vulcanisate of the sol polymer.

Accordingly, the present invention relates to a polychloroprene mixture containing a sol polymer and a gel polymer in a ratio, by weight, of from 1:4 to 9:1, characterised in that both polymers have been produced in the presence of from 2.5 to 4.0 parts, by weight, of the potassium salt of disproportionated abietic acid (expressed as acid), from 0.3 to 1.0 parts, by weight, of a condensation product of naphthalene sulphonic acid and formaldehyde and from 0.2 to 1.5 parts, by weight, of potassium hydroxide, based in each case on 100 parts, by weight, of monomer, and in that the gel polymer is a copolymer of chloroprene and from 1.5 to 2.5 mole percent, based on total monomer, of a diester corresponding to the following general formula:

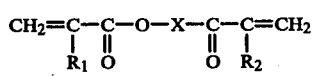

wherein
R$_1$ and R$_2$ independently represent hydrogen, chlorine or C$_1$-C$_4$ alkyl; and
X represents C$_2$-C$_{10}$ alkylene.

Up to 60% of the potassium ions may be replaced by other alkali metal ions, such as Li$^\oplus$ and Na$^\oplus$.

Chloroprene is preferably copolymerised with ethylene glycol dimethacrylate. The polymerisation temperature is preferably from 30° to 55° C.

The sol polymer is mixed with the gel polymer while stirring at temperatures of from 5° to 30° C.

Vulcanisates obtained from a rubber according to the present invention show a tensile strength which is higher by about 2 MPa than that of vulcanisates of rubbers of which the gel polymer has been produced with more than 2.5 mole percent of diester. Although high tensile strengths of the vulcanisates are also obtained with a diester content of less than 1.5 mole percent, the processing properties of the rubber and its mixtures are adversely affected.

Polymerisation of the soluble and cross-linked chloroprene polymer is carried out in emulsion either continuously or in batches using known methods.

EXAMPLE 1

| Production of the sol polymer | |
|---|---|
| Chloroprene | 100.00 g |
| n-dodecyl mercaptan | 0.25 g |
| Deionised water | 120.00 g |
| Potassium salt of a disproportionated abietic acid | 4.00 g |
| Potassium hydroxide | 0.80 g |
| Potassium salt of the condensation product of naphthalene sulphonic acid and formaldehyde | 0.60 g | were polymerised under nitrogen at 40° C., a 1% by wt. aqueous solution of formamidine sulphinic acid continuously flowing into the polymerisation mixture.

The reaction was stopped at a monomer conversion of 65% by the addition of 0.04 g of a 2.5% by wt. solution of diethyl hydroxylamine and the monomer removed by steam distillation.

| Production of the gel polymer | |
|---|---|
| Chloroprene | 95.00 g |
| Ethylene glycol dimethacrylate | 5.00 g |
| n-dodecyl mercaptan | 0.30 g |
| Deionised water | 120.00 g |
| Potassium salt of a disproportionated abietic acid | 3.50 g |
| Potassium hydroxide | 0.40 g |
| Potassium salt of the condensation product of naphthalene sulphonic acid and formaldehyde | 0.60 g | were polymerised under nitrogen at 45° C., a 2.5% by weight aqueous solution of formamidine sulphinic acid continuously flowing into the polymerisation mixture.

The latex of the gel polymer was mixed in different ratios with the latex of the sol polymer. The rubber was isolated by low-temperature coagulation.

The following mixture was then prepared:

| Rubber | 100.00 g |
|---|---|
| Stearic acid | 0.50 g |
| Magnesium oxide | 4.00 g |
| Phenyl-β-naphthylamine | 2.00 g |
| "Aktivruss (active carbon black) N 762" | 30.00 g |
| Zinc oxide | 5.00 g |
| Ethylene thiourea | 0.50 g |

The mixture was vulcanised in 40 minutes at 150° C., the tensile elongation tests being carried out on a standard ring.

The tensile strengths of the vulcanisates obtained from the various mixtures are shown in the following Table:

| Sol polymer [g] | 100 | 80 | 60 | 40 |
|---|---|---|---|---|
| Gel polymer [g] | 0 | 20 | 40 | 60 |
| Tensile strength (MPa) | 17.9 | 17.8 | 19.0 | 18.1 |

For Examples 2 to 5 below, a sol polymer according to Example 1 was continuously polymerised and mixed with a gel polymer containing different quantities of ethylene glycol dimethacrylate in accordance with Example 1. The mixtures contain 60%, by weight, of sol polymer and 40%, by weight, of gel polymer, based on the total polymer. The rubber was mixed and vulcanised in the same way as before.

The tensile strengths of the vulcanisates are shown in the following Table:

|  | Chloroprene [g] | Ethylene glycol dimethacrylate [g] | Tensile strength [MPa] |
|---|---|---|---|
| Example 2 | 90.50 | 9.50 | 14.8 |
| Example 3 | 93.50 | 6.50 | 15.0 |
| Example 4 | 94.50 | 5.50 | 18.8 |
| Example 5 | 97.00 | 3.00 | 18.4 |

In Examples 6 to 9, the sol polymer of Example 1 was mixed with gel polymers containing different quantities of ethylene glycol dimethacrylate produced in accordance with Example 1. The mixtures contain 60%, by weight, of sol polymer and 40%, by weight, of gel polymer, based on total polymer. The swelling which these rubbers undergo on injection was measured as a characteristic feature of the processing behaviour thereof.

|  | Chloroprene [g] | Ethylene glycol dimethacrylate [g] | Swelling on injection (%) |
|---|---|---|---|
| Example 6 | 90.50 | 9.50 | 50 |
| Example 7 | 95.00 | 5.00 | 50 |
| Example 8 | 97.00 | 3.00 | 70 |
| Example 9 | 99.00 | 1.00 | 130 |

We claim:

1. A polychloroprene mixture containing a sol polymer and a gel polymer in a ratio, by weight, of from 1:4 to 9:1, wherein both polymers have been produced in the presence of from 2.5 to 4.0 parts, by weight, of the potassium salt of a disproportionated abietic acid expressed as acid, from 0.3 to 1.0 part, by weight, of a condensation product of naphthalene sulphonic acid and formaldehyde and from 0.2 to 1.5 parts, by weight, of potassium hydroxide, based in each case on 100 parts, by weight, of monomer, and wherein the gel polymer is a copolymer of chloroprene and from 1.5 to 2.5 mole percent, based on total monomer, of a diester corresponding to the following general formula:

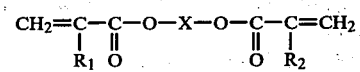

wherein $R_1$ and $R_2$ represent hydrogen, chlorine or $C_1$–$C_4$ alkyl; and

X represents $C_2$–$C_{10}$ alkylene and wherein the sol polymer is a homopolymer of chloroprene.

2. A polychloroprene mixture of claim 1, wherein ethylene glycol dimethacrylate is used as the diester.

3. A process for the production of chloroprene mixtures containing a sol polymer and a gel polymer in a ratio, by weight, of from 1:4 to 9:1, comprising producing both polymers individually by polymerisation in the presence of from 2.5 to 4.0 parts, by weight, of the potassium salt of disproportionated abietic acid expressed as acid, from 0.3 to 1.0 part, by weight, of a condensation product of naphthalene sulphonic acid and formaldehyde and from 0.2 to 1.5 parts, by weight, of potassium hydroxide, based in each case on 100 parts, by weight, of monomer, and subsequently mixing the gel polymer and sol polymer at temperatures of from 5° to 30° C., wherein the gel polymer is a copolymer of chloroprene and from 1.5 to 2.5 mole percent, based on the total monomer, of a diester corresponding to the following general formula:

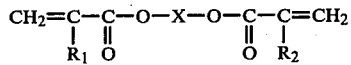

wherein $R_1$ and $R_2$ represent hydrogen, chlorine or $C_1$–$C_4$ alkyl; and

X represents $C_2$–$C_{10}$ alkylene and wherein the sol polymer is a homopolymer of chloroprene.

4. The process of claim 3, wherein 60%, by weight, of the potassium ions are replaced by other alkali metal ions.

* * * * *